United States Patent
Merchant et al.

(10) Patent No.: US 8,335,770 B2
(45) Date of Patent: Dec. 18, 2012

(54) METHOD OF RESTORING DATA

(75) Inventors: Arif Merchant, Los Altos, CA (US); Kimberly Keeton, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2425 days.

(21) Appl. No.: 11/051,200

(22) Filed: Feb. 3, 2005

(65) Prior Publication Data

US 2006/0173935 A1    Aug. 3, 2006

(51) Int. Cl.
*G06F 17/00* (2006.01)

(52) U.S. Cl. ........ 707/682; 707/685; 707/619; 707/645; 707/640; 707/634

(58) Field of Classification Search .................. 707/682, 707/685, 619, 634, 640, 645, 646
See application file for complete search history.

(56) References Cited

U.S. PATENT DOCUMENTS

| | | | |
|---|---|---|---|
| 6,269,381 B1 | 7/2001 | St. Pierre et al. | |
| 7,069,401 B1 * | 6/2006 | Noonan et al. | 711/162 |
| 7,149,858 B1 * | 12/2006 | Kiselev | 711/162 |
| 2004/0236907 A1 * | 11/2004 | Hickman et al. | 711/114 |

OTHER PUBLICATIONS

Ann L. Chervenak et al., Protecting File Systems: A Survey of Backup Techniques, 1998.
Rodger Daniels et al., U.S. Appl. No. 10/979,716, filed Nov. 2, 2004.
Minwen Ji et al., Seneca: remote mirroring done write, Proceedings of USENIX Technical Conference, 2003, pp. 253-268, USENIX, Berkeley, CA.
Kimberly Keeton et al., Designing for disasters, Mar. 31, 2004. <http://www.hpl.hp.com/research/ssp/papers/2004-03-fast-designing-for-disasters.pdf>.
Kimberly Keeton et al., A Framework for Evaluating Storage System Dependability, Jun. 28, 2004. <http://www.hpl.hp.com/research/ssp/papers/DSN04-depmodels.pdf>.
Evan Marcus et al., Blueprints for High Availability, Second Edition, 2003, Wiley Publishing, Inc. Indianapolis, IN.

* cited by examiner

*Primary Examiner* — Sana Al Hashemi

(57) ABSTRACT

An embodiment of a method of restoring data begins with a step of restoring point-in-time data from a local copy. The method concludes with a step of restoring at least a portion of an incremental difference between the point-in-time data and a desired state of the data from a remote mirror.

35 Claims, 2 Drawing Sheets

METHOD OF RESTORING DATA

FIELD OF THE INVENTION

The present invention relates to the field of data storage. More particularly, the present invention relates to the field of data storage where data restoration techniques are used to replace lost or corrupted data.

BACKGROUND OF THE INVENTION

Data protection techniques make copies of data so that primary data may be restored if the primary data is lost or corrupted due to, for example, hardware failure, software failure, or user error. There are a range of techniques available for data protection. Inter-array mirroring protects against loss of a disk within a disk array. Local backup to tape or disk protects against failure of a primary storage device (e.g., a disk drive or a disk array). Remote mirroring protects against a site failure.

A typical data protection configuration employs a local backup that periodically copies data (e.g., on a daily basis) and a remote mirror that synchronously or asynchronously mirrors primary storage. Generally, the backup data is used to restore data to some state in the past and the remote mirror is used to restore loss of primary storage.

SUMMARY OF THE INVENTION

The present invention comprises a method of restoring data. According to an embodiment, the method begins with a step of restoring point-in-time data from a local copy. The method concludes with a step of restoring at least a portion of an incremental difference between the point-in-time data and a desired state of the data from a remote mirror. In an embodiment, the steps of restoring the point-in-time data and restoring the incremental difference are performed at least partially in parallel.

According to another embodiment, a method of restoring data of the present invention begins with a step of restoring point-in-time data from a most recent point-in-time copy located at a primary storage location. The method continues with a step of determining an incremental difference between the point in time copy and a desired state of the data. The method concludes with a step of restoring at least a portion of the incremental difference from the remote mirror.

According to yet another embodiment, a method of restoring data of the present invention begins with a step of restoring point-in-time data from a most recent point-in-time copy located at a primary storage location. The most recent point-in-time copy comprises one of first through nth point-in-time copies made at first through nth times, respectively. The method concludes with a step of restoring at least a portion of an incremental difference between the most recent point-in-time copy and a desired state of the data from a remote mirror, the incremental difference starting at a time indicated by a most recently received marker, the most recently received marker comprising one of first through nth markers sent to the remote mirror from the primary storage location, the first through nth markers indicating the first through nth times, respectively.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
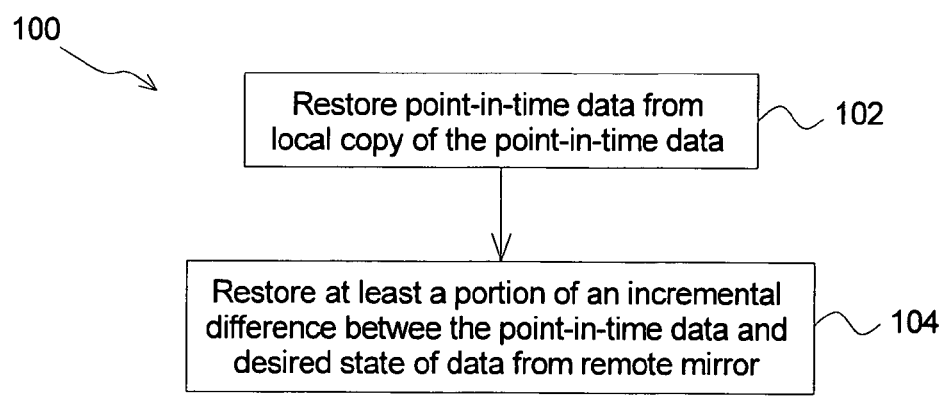
FIG. 1 illustrates an embodiment of a method of restoring data of the present invention as a flow chart.

An embodiment of a method of restoring data of the present invention is illustrated as a flow chart in FIG. 1. The method 100 begins with a first step 102 of restoring point-in-time data from a local copy of the point-in-time data. The method 100 concludes with a second step 104 of restoring at least a portion of an incremental difference between the point-in-time data and a desired state of the data from a remote mirror. The first and second steps, 102 and 104, restore data in a primary storage that has been lost or corrupted. In the first step 102, the restoration copies the local copy into the primary storage. In the second step 104, the restoration copies at least a portion of the incremental difference from the remote mirror into the primary storage.

A number of techniques may be employed to identify the incremental difference (or portion of the incremental difference) on the remote mirror. A preferred technique sends a marker to the remote mirror that indicates a time of making the local copy of the point-in-time data. Data generated after generation of the marker is within the incremental difference. A remote synchronous mirror may employ any of a number of techniques to recognize the data generated after generation of the marker. For example, the marker may be inserted in the stream of writes sent to the synchronous mirror. Or, for example, as data is generated at the primary storage it may be marked with a time stamp or a unique increasing sequence number as the marker. The remote mirror then compares the time stamps or the unique increasing sequence numbers to a particular marker (e.g., a most recent marker) to determine the incremental difference. Similarly, if the remote mirror is a write-order-preserving asynchronous mirror, data in the write-order that is after the time indicated by the marker is within the incremental difference.

If the remote mirror is a batched asynchronous mirror and the batch that includes the marker does not indicate which of the units of data are within the point-in-time data, later batches are within the incremental difference and it is assumed that the batch that includes the marker is also within the incremental difference. Such an assumption may result in transmitting a small amount of un-needed data back to a primary storage site but it ensures that data not within the local copy of the point-in-time data is restored.

If the local point-in-time copy is a snapshot or some other point-in-time copy not taken over a period of time, the remote mirror can garbage collect one or more old markers along with other earlier sequence-indicating data such as timestamp-data logs after receiving a most recent marker. If the local point-in-time copy is a backup that is made over a period of time, backup initiation and completion markers are preferably sent to the remote mirror indicating a backup initiation time and a backup completion time, respectively. When restoring the incremental difference, data generated after the backup initiation marker is assumed to be within the incremental difference. The backup completion marker alerts the remote mirror that garbage collection may be performed on markers earlier than the backup initiation marker along with other earlier sequence-indicating data.

An alternative technique for identifying the incremental difference (or portion of the incremental difference) employs checksums. This technique makes a checksum comparison between units of data within the local copy and the remote mirror. Data having checksums on the remote mirror that are different from checksums for the units of data within the local copy as well as units of data not found in the local copy are within the incremental difference. Also, the checksums may indicate deletions. If some data is found on the local copy and but not on the remote mirror, restoration of the incremental difference includes precluding restoration of the deletions from the local copy or deleting the deletions after restoring the local copy.

Generally, a target recovery time for the desired state of the data will be as recent as possible. However, in some cases, the target recovery time for the desired state of the data will be an earlier time. For example, it may be desired to roll-back data to some earlier state that precedes infection by a virus. By maintaining a log of update, delete, and create operations at the remote location, a particular point-in-time copy earlier than a most recent point-in-time copy in conjunction with an incremental difference from the remote mirror may be used to restore data to the desired state at the earlier time.

Figure 2:
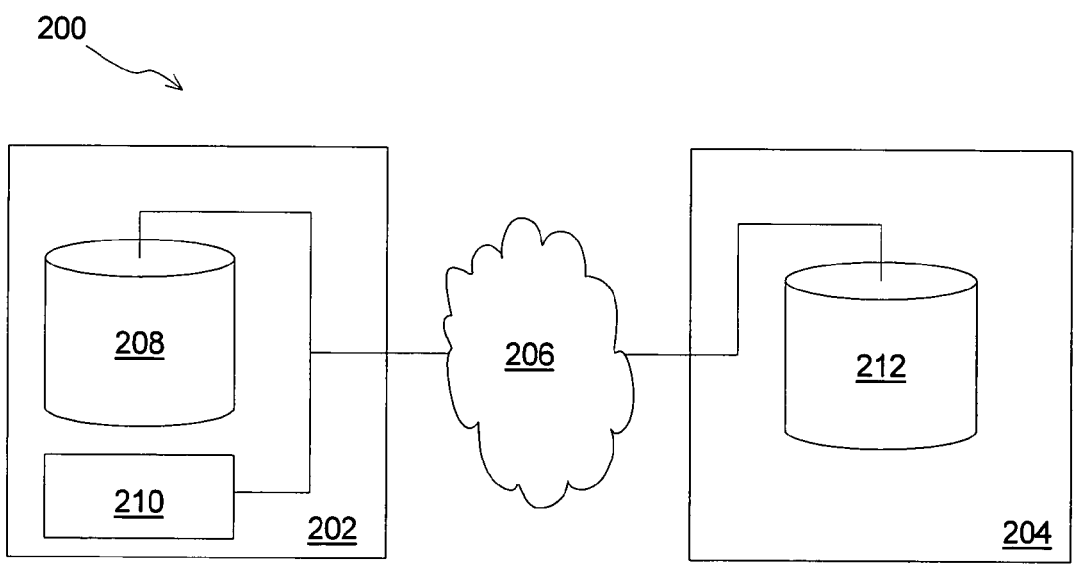
FIG. 2 schematically illustrates an embodiment of a storage system which employs a method of restoring data of the present invention.

An embodiment of a storage system that employs the method 100 is illustrated schematically in FIG. 2. The storage system 200 comprises a local site 202 and a remote site 204, which are coupled together by a network 206. Alternatively, the local site 202 and the remote site 204 are coupled together by one or more communication links. The local site 202 includes primary storage 208 and secondary storage 210. Occasionally, a point-in-time copy of data in the primary storage is formed in the secondary storage 210. The point-in-time copy of the data may be a backup of the data (e.g., a full backup, or a cumulative backup and one or more incremental backups). Alternatively, the point-in-time copy of the data may be a snapshot of the data or a snap-clone of the data (i.e., a copy of a snapshot of the data). The remote site 204 comprises a mirror 212 of the data in the primary storage 208. The mirror 212 may be a synchronous mirror or an asynchronous mirror. Preferably, the primary storage 208 is disk-based storage. Preferably, the mirror 212 is disk-based storage. Alternatively, the primary storage 208 or the mirror 212 or both are some other type of storage. Preferably, the secondary storage is a tape-based storage. Alternatively, the secondary storage 210 is some other type of storage such as a disk-based storage.

In an embodiment of the method 100 (FIG. 1), the first step 102 restores the point-in-time data from the secondary storage 210 (FIG. 2). In this embodiment of the method 100, the second step 104 restores at least the portion of the incremental difference between the point-in-time data and the desired state of the data from the mirror 212.

In an embodiment, the first and second steps, 102 and 104, are performed at least partially in parallel. Such an embodiment may include sending a list of units of data that have been updated since the point-in-time copy of the data was made and skipping restoration of these units of data during the first step 102 of restoring the point-in-time copy of the data. Alternatively, such an embodiment may preclude overwriting units of data restored from the remote mirror while allowing units of data restored from the point-in-time copy to be overwritten.

In an embodiment, the second step 104 restores the entire incremental difference between the point-in-time copy of the data and the desired state of the data. In other embodiments, a remainder of the incremental difference is restored from one or more other remote mirrors where each of the other remote mirrors provides a unique portion of the remainder of the incremental difference. For example, the remote mirror and the one or more remote mirrors may be selected on the basis of an expectation a minimal response time for providing the incremental difference.

An alternative embodiment of a method of restoring data of the present invention begins with a step of restoring point-in-time data from a most recent point-in-time copy located at a primary storage location. The most recent point-in-time copy is one of a range of first through nth point-in-time copies made at first through nth times, respectively.

Figure 3:
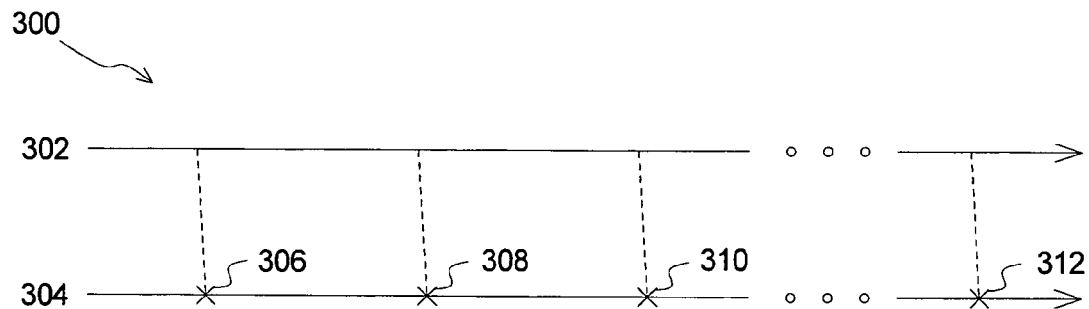
FIG. 3 illustrates a sequence diagram indicating primary storage and point-in-time copies timelines in accordance with an embodiment of the present invention.

FIG. 3 is a sequence diagram 300 indicating primary storage and point-in-time copies timelines, 302 and 304. The first point-in-time copy 306 was made at the first time. Second and third point-in-time copies, 308 and 310, were made at second and third times, respectively. The nth point-in-time copy 312 was made at an nth time. As the first through nth point-in-time copies, 306 . . . 312, were made first through nth markers indicating the first through nth times, respectively, were sent to the remote mirror. If the point-in-time copies were made employing a backup technique that takes place over a period of time, the first through nth times are backup initiation times. If the point-in-time copies were made using a snapshot technique, the first through nth times are snapshot times.

The method continues with a step of restoring at least a portion of an incremental difference between the most recent point-in-time copy and a desired state of the data from a remote mirror. The incremental difference starts at a time indicated by a most recently received marker. Here, the nth marker is the most recently received marker.

The point-in-time copies of the present invention may be made using a number of techniques. In one technique, a snapshot is taken of the primary storage. For example, the snapshot may be taken by mirroring the data up to a point-in-time and then not mirroring later changes to the primary storage. The snapshot may then be copied to backup devices such as one or more tapes or one or more disks. In another technique, the backup is made over a period of time having a start time and an end time. Here, it is uncertain as to whether data that is added or modified in the primary storage during the period of time will appear in the backup. For this type of backup, the marker sent to the remote mirror indicates the start time of the backup. An additional marker may be sent to the remote mirror also so that the remote mirror can recognize that a most recent backup is complete.

Figure 4:
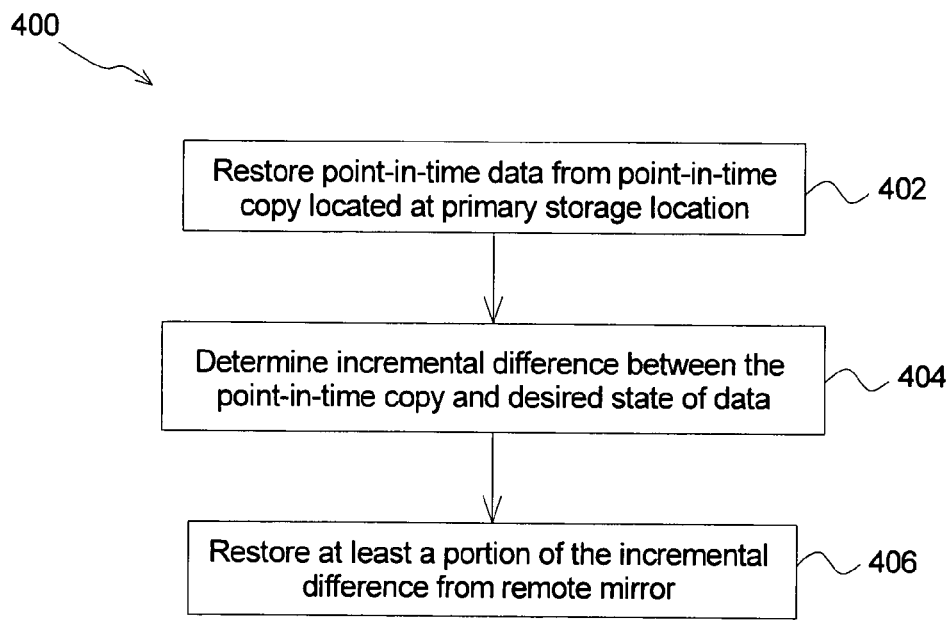
FIG. 4 illustrates an alternative embodiment of a method of restoring data of the present invention as a flow chart.

Another embodiment of a method of restoring data of the present invention is illustrated as flow chart in FIG. 4. The method 400 begins with a first step 402 of restoring point-in-time data from a point-in-time copy (e.g., a most recent point-in-time copy) located at a primary storage location. The method 400 continues with a second step 404 of determining an incremental difference between the point in time copy and a desired state of the data. In an embodiment, the second step 404 employs a marker sent from a primary storage site to the remote mirror that indicates a time when the point-in-time copy was made. In another embodiment, the second step 404 employs a checksum comparison between the point-in-time data and the remote mirror. Such a comparison may be used to determine duplicate data within the remote mirror, which identifies remaining data as the incremental data by implication. Alternatively, the checksum comparison directly identifies the incremental difference. The method concludes with a third step 406 of restoring at least a portion of the incremental difference from the remote mirror.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of restoring data comprising the steps of:
   restoring point-in-time data from a local copy; and
   restoring at least a portion of an incremental difference between the point-in-time data and a desired state of the data from a remote mirror.

2. The method of claim 1 wherein the local copy of the data is selected from a group consisting of a snapshot, a snap-clone, a backup, and another type of data copy.

3. The method of claim 1 wherein the local copy of the data comprises a backup.

4. The method of claim 3 wherein the backup comprises a cumulative backup and one or more incremental backups.

5. The method of claim 1 wherein the step of restoring at least the portion of the incremental difference adds most recently updated data to the point-in-time data.

6. The method of claim 1 wherein the desired state of the data is an interim state between the point-in-time data and a most recent state of the data at the remote mirror.

7. The method of claim 6 wherein the local copy of the point-in-time data is one of a plurality of local copies made over time.

8. The method of claim 7 wherein the local copy of the point-in-time data precedes a most recent local copy.

9. The method of claim 1 wherein the remote mirror comprises an asynchronous mirror.

10. The method of claim 1 wherein the remote mirror comprises a synchronous mirror.

11. The method of claim 1 wherein the steps of restoring the point-in-time data and restoring at least the portion of the incremental difference are performed at least partially in parallel.

12. The method of claim 1 further comprising the step of restoring a remainder of the incremental difference from one or more other remote mirrors.

13. The method of claim 12 wherein each of the one or more other remote mirrors provides a unique portion of the remainder of the incremental difference.

14. The method of claim 13 wherein the remote mirror and the one or more other remote mirrors are selected on a basis of an expectation of a minimal response time.

15. The method of claim 1 wherein the step of restoring at least the portion of the incremental difference between the point-in-time data and the desired state of the data from the remote mirror employs a marker sent to the remote mirror which identifies a time when the point-in-time copy was made.

16. The method of claim 1 wherein the step of restoring at least the portion of the incremental difference between the point-in-time data and the desired state of the data from the remote mirror employs a checksum comparison between point-in-time data units and remote-mirror data units to determine which of the remote-mirror data units are within the incremental difference.

17. A method of restoring data comprising the steps of:
    restoring point-in-time data from a point-in-time copy located at a primary storage location;
    determining an incremental difference between the point in time copy and a desired state of the data; and
    restoring at least a portion of the incremental difference from the remote mirror.

18. The method of claim 17 wherein the step of determining the incremental difference between the point-in-time copy and the desired state of the data comprises identifying data sent after a time indicated by a marker sent to the remote mirror.

19. The method of claim 17 wherein the step of determining the incremental difference between the point-in-time copy and the desired state of the data employs a checksum comparison between the point-in-time copy and the remote mirror.

20. The method of claim 19 wherein the checksum comparison determines duplicate data between the point-in-time copy and the remote mirror, the incremental difference comprising non-duplicate data.

21. A method of restoring data comprising the steps of:
    restoring point-in-time data from a most recent point-in-time copy located at a primary storage location, the most recent point-in-time copy comprising one of first through nth point-in-time copies made at first through nth times, respectively; and
    restoring at least a portion of an incremental difference between the most recent point-in-time copy and a desired state of the data from a remote mirror, the incremental difference starting at a time indicated by a most recently received marker, the most recently received marker comprising one of first through nth markers sent to the remote mirror from the primary storage location, the first through nth markers indicating the first through nth times, respectively.

22. The method of claim 21 wherein the remote mirror comprises an asynchronous mirror.

23. The method of claim 21 wherein the remote mirror comprises a synchronous mirror.

24. The method of claim 21 wherein the steps of restoring the point-in-time data and restoring at least the portion of the incremental difference are performed at least partially in parallel.

25. The method of claim 21 further comprising the step of restoring a remainder of the incremental difference from one or more other remote mirrors.

26. The method of claim 25 wherein each of the one or more other remote mirrors provides a unique portion of the remainder of the incremental difference.

27. The method of claim 25 wherein the remote mirror and the one or more other remote mirrors are selected on a basis of an expectation of a minimal response time.

28. The method of claim 21 wherein the first through nth point-in-time copies comprise first through nth snapshots or first through nth snap-clones.

29. The method of claim 21 wherein the first through nth point-in-time copies comprise first through nth backups.

30. The method of claim 29 wherein one or more of the first through nth backups comprise a cumulative backup and one or more incremental backups.

31. The method of claim 29 wherein the first through nth backups were each made over a time period having a start time and an end time.

32. The method of claim 31 wherein the first through nth times indicated by the first through nth markers are first through nth start times, respectively.

33. A computer readable media having stored thereon computer code which when executed implements a method of restoring data, the method of restoring the data comprising the steps of:
    restoring point-in-time data from a local copy; and
    restoring at least a portion of an incremental difference between the point-in-time data and a desired state of the data from a remote mirror.

34. A computer readable media comprising having stored thereon computer code which when executed implements a method of restoring data, the method of restoring the data comprising the steps of:

restoring point-in-time data from a point-in-time copy located at a primary storage location;

determining an incremental difference between the point in time copy and a remote mirror; and restoring at least a portion of the incremental difference from the remote mirror.

35. A computer readable media having stored thereon computer code which when executed implements a method of restoring data, the method of restoring the data comprising the steps of:

restoring point-in-time data from a most recent point-in-time copy located at a primary storage location, the most recent point-in-time copy comprising one of first through nth point-in-time copies made at first through nth times, respectively; and restoring at least a portion of an incremental difference between the most recent point-in-time copy and a desired state of the data from a remote mirror, the incremental difference starting at the time indicated by a most recently received marker, the most recently received marker comprising one of first through nth markers sent to the remote mirror from the primary storage location, the first through nth markers indicating the first through nth times, respectively.

* * * * *

UNITED STATES PATENT AND TRADEMARK OFFICE
CERTIFICATE OF CORRECTION

PATENT NO. : 8,335,770 B2
APPLICATION NO. : 11/051200
DATED : December 18, 2012
INVENTOR(S) : Arif Merchant et al.

Page 1 of 1

It is certified that error appears in the above-identified patent and that said Letters Patent is hereby corrected as shown below:

In the Claims

In column 7, line 1, in Claim 34, after "media" delete "comprising".

Signed and Sealed this
Fourteenth Day of May, 2013

Teresa Stanek Rea
*Acting Director of the United States Patent and Trademark Office*